US005988911A

United States Patent [19]

Browne, Jr. et al.

[11] Patent Number: 5,988,911

[45] **Date of Patent: *Nov. 23, 1999**

[54] SOAP AND WATER DISPENSING SYSTEM

[75] Inventors: Leland Warren Browne, Jr., Joplin, Mo.; Leland Warren Browne III, Arlington, Tex.; Carl Lammons, Arlington, Tex.; James B. Story, Denton, Tex.; Michael Woodford Freitas, N. Richland Hills, Tex.; David Lee Kearby, N. Richland Hills, Tex.; John Faris Cunningham, Garland, Tex.; Walter Edward Stewart, Carrollton, Tex.

[73] Assignee: The Leland Group, Inc., Arlington, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,917

[22] Filed: Apr. 28, 1997

Related U.S. Application Data

[63] Continuation-in-part of application No. 08/556,535, Nov. 13, 1995, abandoned.

[51] Int. Cl.[6] ........................... A46B 11/02; A46B 11/06; F16K 17/34

[52] U.S. Cl. ................................ 401/42; 401/43; 401/46; 401/47; 239/310; 239/315; 137/484.2; 251/24

[58] Field of Search ................................ 401/40, 42, 43, 401/46, 47; 239/318, 315, 310; 251/24, 155; 137/502, 484.2; 141/211

[56] References Cited

U.S. PATENT DOCUMENTS

| | | | |
|---|---|---|---|
| D. 189,179 | 11/1960 | Manville | D91/3 |
| D. 253,770 | 12/1979 | Flynn et al. | D15/36 |
| 1,153,850 | 9/1915 | Meier | 137/502 X |
| 1,503,664 | 8/1924 | Richardson | 137/484.2 |
| 2,103,957 | 12/1937 | Scott | 15/127 |
| 2,227,578 | 1/1941 | Fraser | 251/24 X |
| 2,508,958 | 5/1950 | Manville | 15/129 |
| 2,521,929 | 9/1950 | McNeil, Jr. | 15/129 |
| 2,540,064 | 1/1951 | Weber | 299/84 |
| 2,593,178 | 4/1952 | Paul | 15/129 |
| 2,641,507 | 6/1953 | McGregor | 299/83 |
| 2,652,850 | 9/1953 | Manville | 137/218 |
| 2,671,691 | 3/1954 | Schnell | 299/83 |
| 2,689,767 | 9/1954 | Dabringhaus, Jr. | 299/84 |
| 2,691,510 | 10/1954 | Manville | 261/78 |
| 2,710,020 | 6/1955 | Manville | 137/512 |
| 2,793,379 | 5/1957 | Moore | 15/129 |
| 2,822,559 | 2/1958 | Manville | 15/128 |
| 2,848,728 | 8/1958 | Graff et al. | 15/129 |
| 2,855,619 | 10/1958 | Graham | 15/129 |
| 2,962,728 | 12/1960 | Kuvin | 4/167 |
| 2,975,804 | 3/1961 | Dunn et al. | 137/604 |
| 3,018,489 | 1/1962 | Saflarski | 4/166 |
| 3,371,370 | 3/1968 | Feser | 401/46 |
| 3,552,714 | 1/1971 | Manville | 251/88 |
| 4,183,501 | 1/1980 | Flynn | 251/357 |
| 4,187,875 | 2/1980 | Flynn | 137/576 |
| 4,998,836 | 3/1991 | Scripnick | 401/42 |

*Primary Examiner*—Steven A. Bratlie
*Attorney, Agent, or Firm*—Jenkens & Gilchrist p.c.

[57] ABSTRACT

A washing soap dispensing system and method of manufacture comprising a wand adapted for the discharge of water therefrom in a second mode of operation and for the discharge of water and soap in a first mode of operation. The washing wand is constructed with a chamber adapted for containing concentrated liquid soap. The system includes an adjustable metering device for accurately dispensing concentrated liquid soap from the wand and a fluid assist water valve to control the flow of water through the wand.

32 Claims, 7 Drawing Sheets

FIG. 6
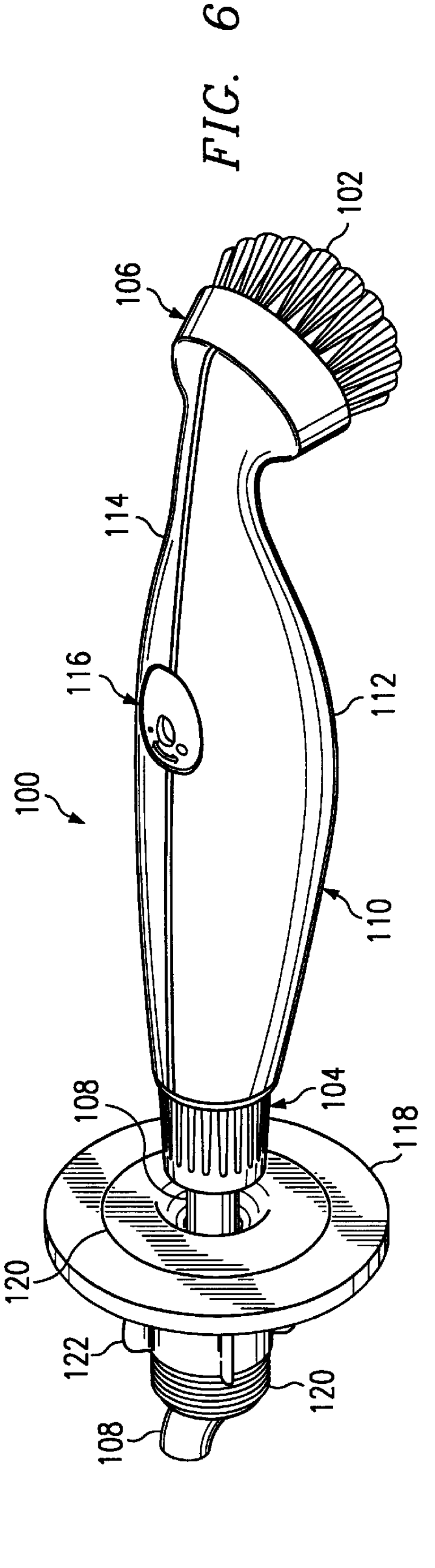
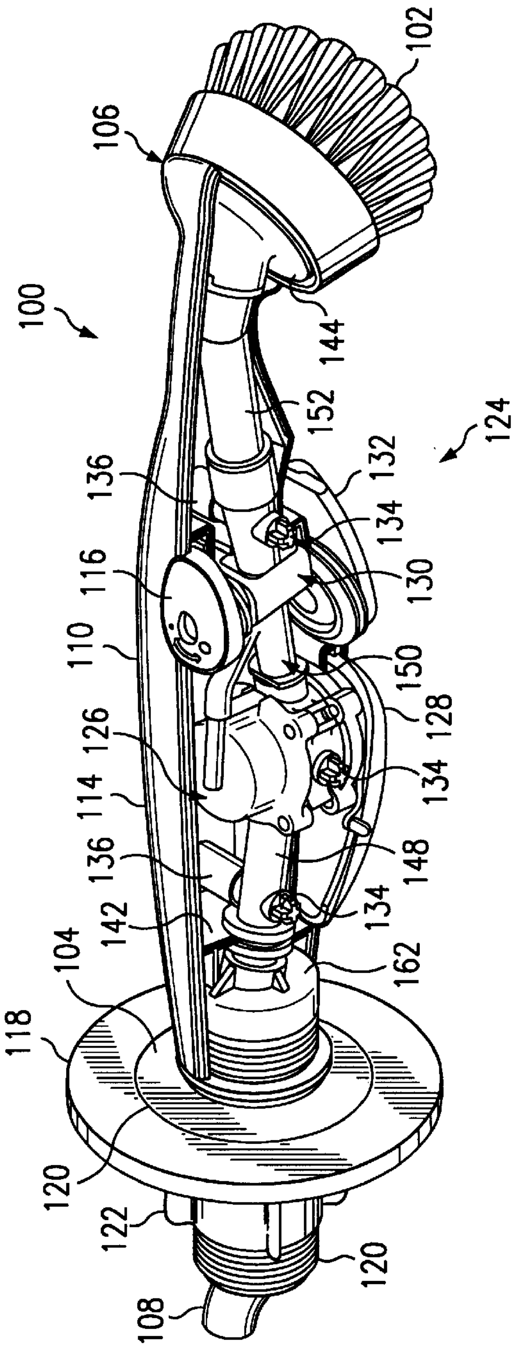
FIG. 7

SOAP AND WATER DISPENSING SYSTEM

This application is a Continuation-in-Part of U.S. patent application Ser. No. 08/556,535 filed Nov. 13, 1995, now abandoned.

BACKGROUND OF THE INVENTION

1. Technical Field of the Invention

The present invention relates to washing systems and, more particularly, to a soap and/or water dispensing wand for use in areas such as a sink.

2. Description of Related Art

Hand-held washing devices, such as those used in kitchen areas for cleaning pots, pans, dishes, silverware and the like, have been the subject of considerable design innovation for decades. Such devices are often constructed for attachment to the water discharge line of the sink for facilitating select positioning of discharged water upon the item to be cleaned. In some prior art designs, brushes are assembled with the wand and the water supply line being flexibly attached for facilitating its use. In certain prior art embodiments, a soap dispensing mechanism is also included within the washing device to facilitate the convenient, direct discharge of soap and/or soapy water solutions onto areas in need of cleaning.

The selected discharge of soap into a stream of water used for washing is well established in the prior art. Many of the soap supply systems have even been incorporated directly into washing systems. Such a design facilitates ease and use of the washing device and expedites the washing process for the user. One such prior art device is set forth and shown in U.S. Pat. No. 2,689,767 which issued on Sep. 21, 1954. This patent entitled "Dishwasher Device" teaches a tubular handle assembly forming an elongated soap receptacle and a throat portion extending from one end of the soap receptacle, into which soap may be discharged, in conjunction with the flow of water therethrough. A piston is used in conjunction therewith for actuation by the hand of the user for pumping soap into the discharge stream.

Pumping of liquid into the discharge stream has not always been acceptable. Some prior art devices include means for drawing soap solution from a reservoir region in order to discharge the soap solution from a handle. U.S. Pat. No. 2,848,728 is a 1955 patent teaching such a concept. Because of the viscosity of concentrated liquid soap, it has often been more expeditious to provide a system for manually pumping the liquid soap. In this manner, a select amount of soap can be dispensed. It would obviously be more convenient for the user to fill a handle with liquid soap and provide for its automatic discharge from the handle. Some prior art systems have addressed the problem of the soap viscosity by first diluting the soap with water. However, a soap and water solution can compromise the integrity of the soap and can result in other problems and disadvantages, including the consistency of the mixture, the shelf life thereof, the size of the required reservoir, and related issues.

Some prior art systems for addressing the numerous problems of soap and water dispensing apparatus of this variety include U.S. Pat. Nos. 3,371,370, 2,103,957 and 2,855,619. Each of these patents teach methods of and apparatus for mixing soap and water for selective dispensing. No single reference provides, however, a design that overcomes all of the problems of the prior art in the most cost effective manner.

It would be an advantage therefore to provide a reliable soap and water dispensing system which is economical to fabricate, easy to actuate and adapted for use with concentrated liquid soap in an undiluted capacity. It would also be an advantage to provide such a system without the need to manually pump said soap into said discharge stream. The present invention overcomes the problem of the prior art by providing an in-line liquid discharge system specifically adapted for, and capable of, reliable use with concentrated liquid washing soap for the automatic dispensing thereof directly into a discharge stream for the washing of an item. The present invention utilizes the Venturi principle, and it utilizes a means for carefully metering the discharge of liquid soap in a fashion that provides increased reliability for the user.

SUMMARY OF THE INVENTION

The present invention relates to a soap discharge device for washing systems. More particularly, one aspect of the present invention comprises a washing wand for containing and discharging liquid soap and water under pressure in a first operational mode and only water in a second operational mode, for the washing of items in an adjacent area, such as a sink. The wand comprises an elongated housing having a brush formed on an end thereof. The housing has a hollow portion formed therethrough for defining a flow path therein. The flow path includes a first end comprising a connector for attachment to a pressurized water supply and a second end attached to the brush. Means are provided for sealing the housing for defining a chamber therein for containing liquid soap. A venturi throat is formed within the flow path of the housing having a first port in flow communication with the pressurized water supply and a second port in flow communication with the chamber. Means are positioned in the second port for metering a select amount of liquid from the chamber into the venturi throat during the passage of pressurized water therethrough.

In another aspect, the above-referenced flow path of the housing may comprise a tubular member having the venturi throat formed therein, the tubular member being axially aligned within the elongated housing. The metering means comprises a tapered plug removably mounted within the second port. The second port may comprise a tapered aperture or hole formed through the wall of the flow path of the housing. The tapered plug is then formed with tapered side walls received within the tapered aperture or hole. A button may be mounted in the housing and connected to the plug for the movement thereof outwardly from the tapered aperture upon the depression of the button.

One aspect of the present invention includes a screw adjustment mechanism for the tapered plug allowing changes in the "richness" of the mixture discharged from the wand. The tapered plug also serves to automatically "clean out" build up of soap residue in the above-described second port each time it is operated.

Another aspect of the present invention includes a water valve to control the flow of water through the flow path. The water valve comprises fluid assist elements to move the water valve to the fully open position by using the pressurized water in said wand upon movement of the water valve from the closed position.

In another aspect of the present invention, the negative pressure from the venturi throat is also used to assist in maintaining the water valve in the fully open position.

BRIEF DESCRIPTION OF THE DRAWINGS

A more complete understanding of the method and apparatus of the present invention may be had by reference to the following Detailed Description when taken in conjunction with the accompanying Drawings wherein:

FIG. 6 is an enlarged perspective view of a second embodiment of the soap dispensing washing system of the present invention;

FIG. 7 is an enlarged perspective view, with parts broken away to illustrate interior details, showing the soap dispensing washing system of FIG. 6;

DETAILED DESCRIPTION OF EMBODIMENTS

Figure 1:
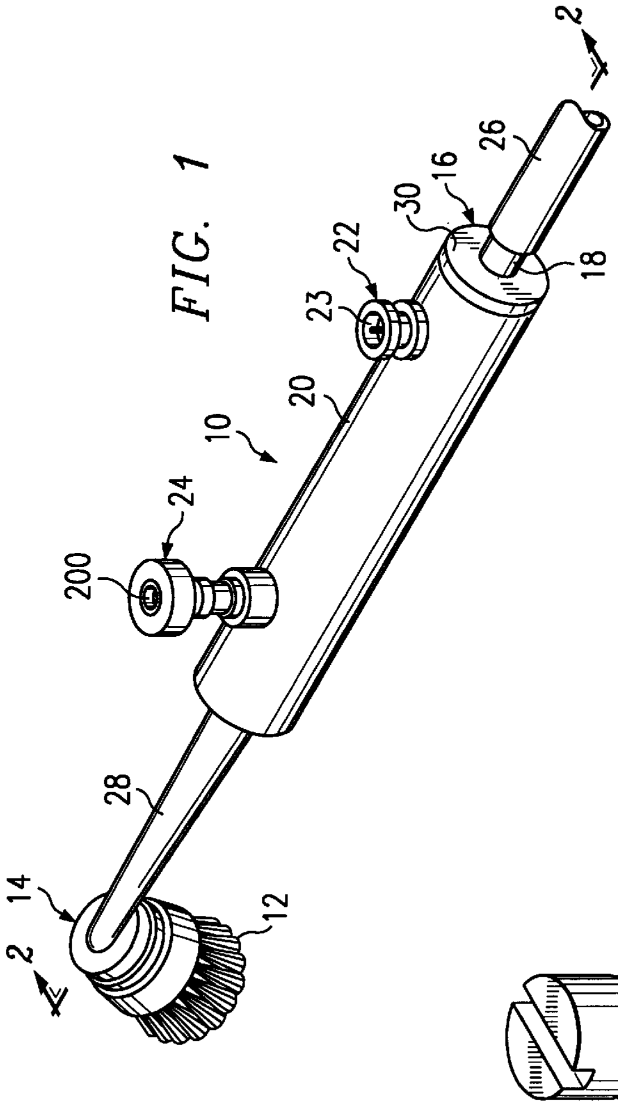
FIG. 1 is a perspective view of a first embodiment of the soap dispensing washing system of the present invention.

Referring first to FIG. 1 there is shown a perspective view of a first embodiment of a washing wand 10 constructed in accordance with the principles of the present invention. The wand 10 comprises a removable brush 12 disposed on a first end 14 thereof. On a second end 16, a hose connector 18 is secured thereto. The wand 10 is formed from an elongated, cylindrical body or housing 20 having a hollow construction forming a chamber therein which may be filled through access plug 22. The access plug 22 is constructed with a check valve 23 to vent the inside of hollow body or housing 20 as discussed in more detail below. An adjustable actuation button 24 is mounted in the hollow body 20 to effect the discharge of liquid soap contained within the hollow body 20 in a first mode of operation. Water provided under pressure is supplied by flexible line 26 to the wand 10. The water passes through the tapered neck region 28 and is discharged through the brush 12 without soap in a second operational mode. When the button 24 is depressed, concentrated soap contained within the chamber of hollow body 20 is drawn and mixed with the water under pressure and is discharged through the brush 12 in said first operational mode.

Referring still to FIG. 1, the wand 10 comprises an apparatus for the storage and discharge of concentrated liquid soap and water for the washing of items in an adjacent area such as a sink (not shown). The hollow body 20 has formed therein a flow path, described below, which accommodates the passage of the water under pressure therethrough. Means are provided in the present invention in the form of a plug 30 for sealing the second end 16 of the body 20 for defining a chamber therein for the containment of the liquid soap. In commercial embodiments of the present invention, it is contemplated that the body 20 will be molded from plastic with plug 30 integrally formed therewith. As defined below, the flow path is constructed with a venturi chamber that has an access port exposed to the soap contained within the chamber to suck the liquid soap therefrom. An adjustment mechanism 200 is assembled in the button 24 to adjust the metered amount of liquid drawn from the chamber of body 20. This aspect will be described below with regard to FIG. 4 where it will be more clearly seen.

Figure 2:
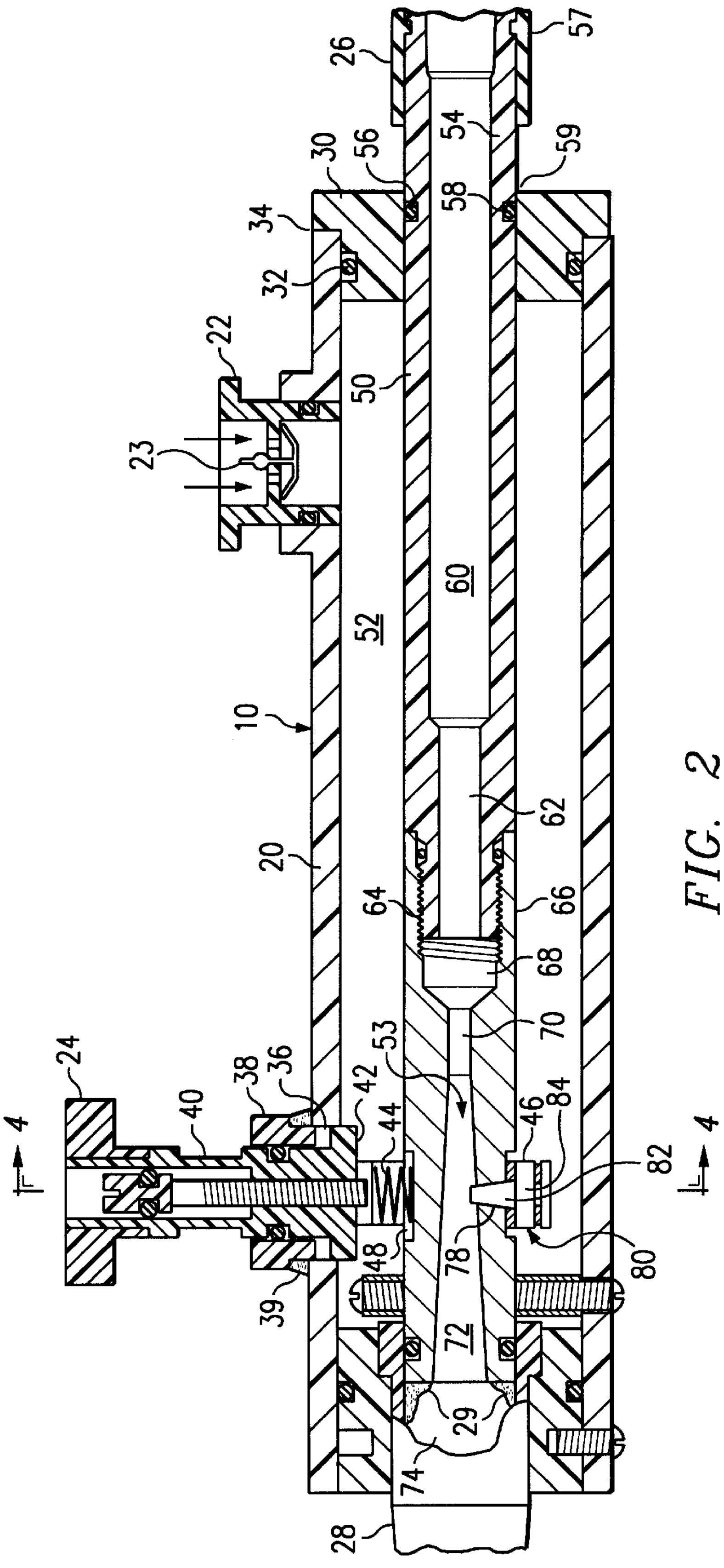
FIG. 2 is an enlarged side elevational, cross-sectional view of the washing wand of FIG. 1.

Referring now to FIG. 2 there is shown an enlarged, side elevational, cross-sectional view of the body 20 of FIG. 1 taken along lines 2—2 thereof. In this particular view, it may be seen that the plug 30 of this embodiment of the invention is sealed within the body 20 by an o-ring 32 positioned within a circumferential groove 34 formed around the plug 30. The access plug 22 is shown to be formed with a check valve 23 to allow vent air to pass into the hollow body 20. The sealing configuration prevents soap from leaking out. Likewise, the button 24 is disposed within an aperture 36 formed in the sidewall of the body 20, which button 24 includes a mounting and sealing element 38 formed circumferentially around an actuation member 40 and sealed with a ring of sealant 39, such as epoxy or the like. Actuation member 40 has an underside 42 that is outwardly biased by a spring member 44 bearing thereagainst. The spring member 44 is held in position in an indentation 48 of a flow path member 50. The flow path member 50 is disposed in and aligned through the hollow body 20 of the wand 10. The tapered neck region 28 may also be assembled to the hollow body 20 with epoxy fillets 29.

Still referring to FIG. 2, the flow path member 50 is comprised of an elongate tubular member having formed therein a venturi section 53 adjacent to the indentation 48 and button 24. The flow path member 50 is constructed of a first tubular section 54 having an end 57 adapted for connection to the water supply flexible line 26. First tubular section 54 is constructed with an o-ring mounting groove 56 in which is disposed an o-ring 58 adapted to be received therein within aperture 59 of the plug 30. The first tubular section 54 is also constructed with a central bore 60 which, in this particular embodiment, has a necked region 62 formed axially through and of a size adapted to accommodate a threaded mounting region 64 that couples to a second, tubular section 66 in which the venturi section 53 is formed. This assembly of threaded members may also change to an integrally molded unit in commercial designs of the present invention.

Figure 5:
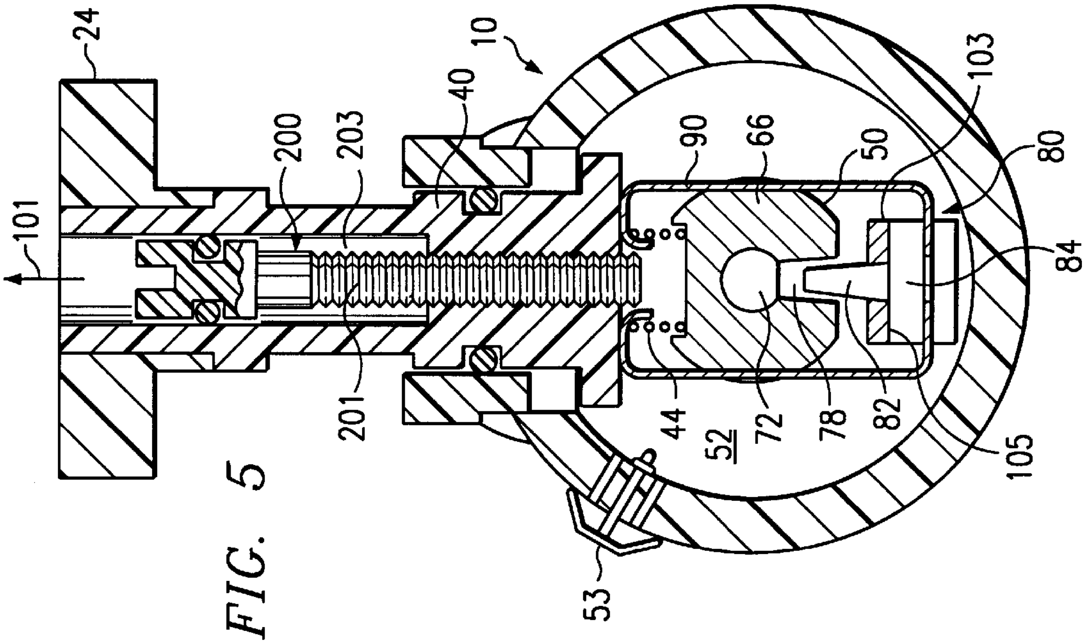
FIG. 5 is an end-elevational cross-sectional view of the washing wand of FIG. 4 illustrating the "open position" of the metering system therein.

Referring still to FIG. 2, the venturi section 53 is constructed with a first feed region or port 68 that tapers into the narrow venturi throat 70, having a cross-sectional diameter which, in the present embodiment, is substantially smaller than the cross-sectional diameter of the necked region 62. The narrow venturi throat 70 is positioned in axial flow communication with an outwardly tapering, venturi throat 72 forming a conventional venturi section which discharges into an open flow line 74 formed in tapered neck region 28. Located at the outwardly tapering venturi throat section 72, a metering plug 80 is positioned within a tapered aperture or port 78 formed in the side wall of the second tubular section 66. The metering plug 80 thus comprises a tapered plug body 82 having side walls adapted for matingly engaging the taper of the tapered aperture 78. The metering plug 80 is adjustable and also constructed with a head 84 which is integrally attached to the mounting assembly 46, as will be described in more detail below. By positioning the metering plug 80 as shown in FIG. 5, with a tapered side wall configuration, the passage of water under pressure through the flow path member 50 will cause the soap contained within the chamber 52 to be sucked into the outwardly tapering venturi throat 72 and discharged outwardly thereof with said water. The metering plug 80 is shown in the closed position in FIG. 2. Other advantages of the metering plug 80, such as residue clean-out, will be discussed below.

Figure 3:
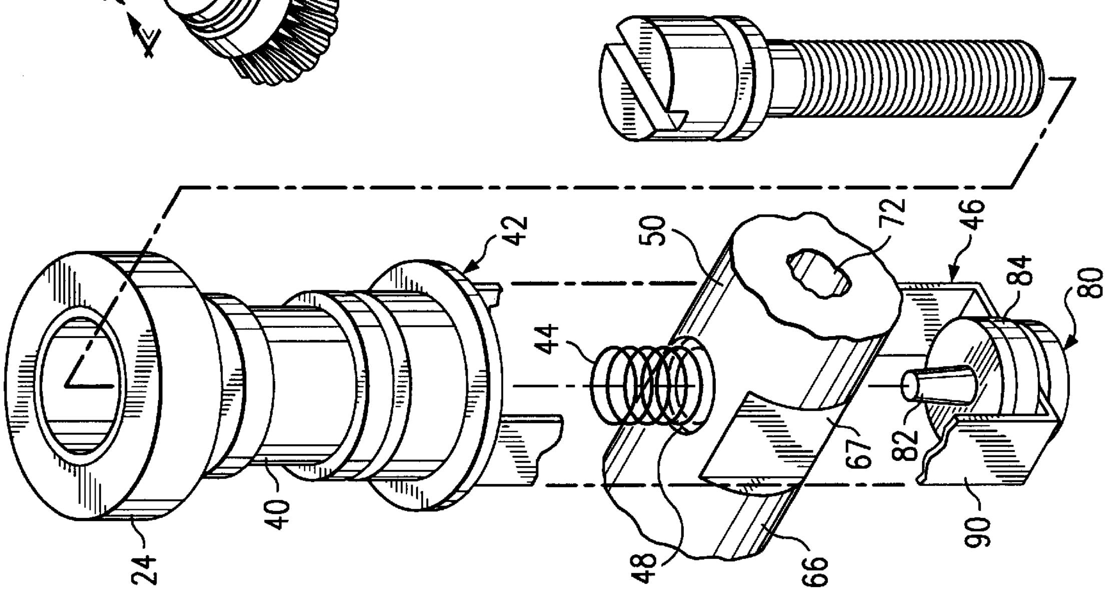
FIG. 3 is an enlarged, fragmentary, exploded perspective view of the metering system of the washing wand of FIG. 1.

Referring now to FIG. 3 there is shown an enlarged, exploded, perspective view of the assembly of the metering plug 80. Tapered plug body 82 extends from the head 84 while positioning frame 90, comprising a portion of a mounting assembly 46, is secured to said head 84 and extends outwardly and along side of the second tubular section 66 of flow path member 50 to engage the button 24. More specifically, the side members of the positioning frame 90 engage the underside 42 of the actuation member 40 to facilitate its downward movement against spring member 44. The sides 67 of second tubular section 66 are grooved to facilitate the positioning of positioning frame 90 therealong, as herein shown. The mounting and sealing element 38 is not illustrated in this view for purposes of clarity. What is shown is the indentation 48 adjacent to the outwardly tapering venturi throat 72 shown as extending therethrough.

Figure 4:
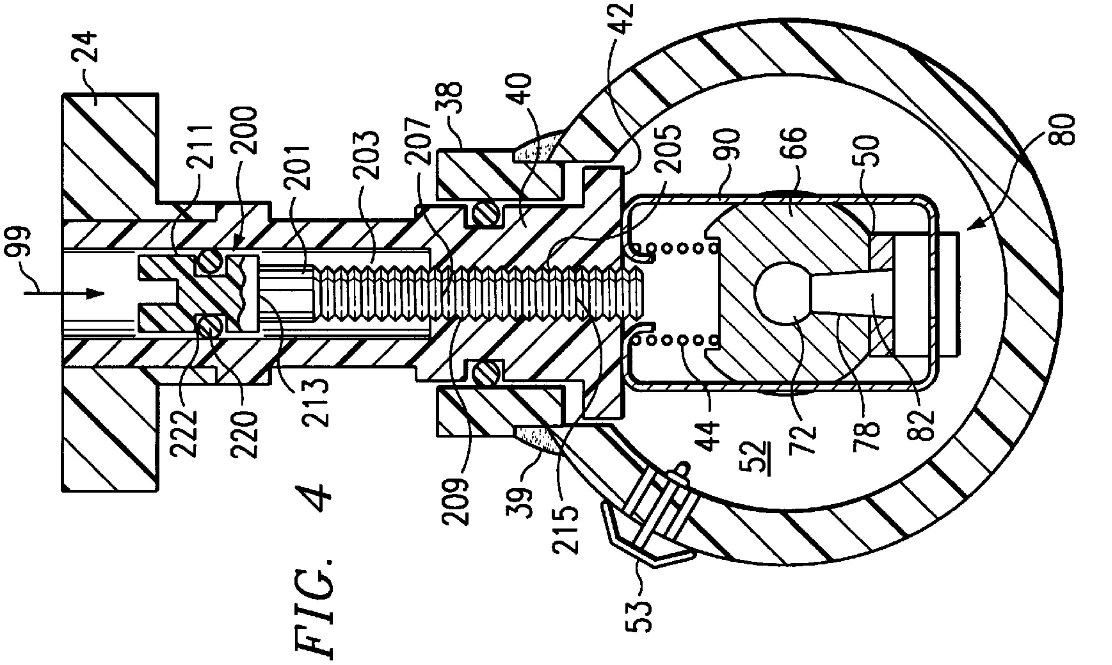
FIG. 4 is an end-elevational cross-sectional view of the washing wand of FIG. 2 taken along lines 4—4 thereof and illustrating the "closed position" of the metering system therein.

Referring now to FIG. 4 there is shown an end elevational, cross-sectional view of the metering plug 80 discussed above. The positioning frame 90 extending along side the second tubular section 66 of flow path member 50 is clearly shown. Likewise the tapered plug body 82 is shown contiguous to, and in a flow communication with the outwardly tapering venturi throat 72 defined above. The spring member 44 is clearly shown bearing against the underside 42 of the actuation member 40 defined above. It may be seen that pressure in the direction of the arrow 99 upon actuation member 40 will cause (as shown in FIG. 5) the downward movement of the positioning frame 90 and the concomitant downward movement of the tapered plug body 82 out of tapered aperture 78 to facilitate the passage of liquid soap drawn therethrough by the pressure differential between the outwardly tapering venturi throat 72 and the chamber 52. A check valved venting port 55 may be formed in the side wall of chamber 52 to prevent excessive positive pressure build up in the chamber 52 if the wand 10 is operated incorrectly. The check valved venting port 55 allows fluid to escape, for safety purposes, only if a pre-select pressure is surpassed.

Referring still to FIG. 4, there is shown in more detail the adjustment mechanism 200 which includes a screw 201 mounted within a central bore 203 of button 24. The lower region 205 of central bore 203 includes threads 207 which matingly engages threads 209 of screw 201. An adjustment head 211 is secured to the top 213 of screw 201 for adjusting the extension of lower region 215 of screw 201 from the underside 42 of actuation member 40. The length which lower region 215 extends determines the distance which the button 24 may be depressed against spring member 44. This distance of depression also determines the distance which tapered plug body 82 moves out of tapered aperture 78. This distance of travel determines the size of the clearance space between tapered plug body 82 and tapered aperture 78 and thus the amount of fluid which will be drawn therethrough for a given venturi suction. The adjustment mechanism 200 thus provides an adjustment for the amount of concentrated liquid soap drawn from chamber 52 and the adjustment can be made with a conventional screw driver inserted into groove 223 of adjustment head 211 and turned therein. A thumb screw may also be used to eliminate the need for screw drivers. An O-ring 220 is inserted into an O-ring groove 222 formed around adjustment head 211 as shown for purposes of sealing thereagainst. Also shown in this view is sealant 39 disposed around mounting and sealing element 38. In that regard, it may be seen that the button 24 is not integrally formed with actuation member 40 to permit assembly of mounting and sealing element 38 therearound.

Referring now to FIG. 5 there is shown the positioning of the tapered plug body 82 relative to the tapered aperture 78 of second tubular section 66 of flow path member 50 with the actuation member 40 fully depressed from the closed position shown in FIG. 4. The screw 201 is shown to serve as a stop for actuation member 40. The outwardly tapering venturi throat 72 carrying water under pressure therethrough then creates a low pressure region drawing soap from the region of the chamber 52 through the tapered aperture 78 for discharge from the wand 10 as described above. The spring member 44 is shown compressed in this particular position with arrow 101 showing the direction that the actuation member 40 will move after the pressure is removed therefrom. Pressure is preferably supplied by the thumb or finger of the user (not shown). This upward movement, in the direction of arrow 101, will cause the tapered plug body 82 to again be seated within the tapered aperture 78. To prevent the inadvertent passage of soap contained within the chamber 52 into the flow stream passing through the outwardly tapering venturi throat 72, seal 103 is preferably placed on the underside 105 of the head 84 of the metering plug 80. Such a sealing design may be necessary for reliability during the rinsing operation utilizing the wand 10. Should soap in chamber 52 be inadvertently allowed to leak through the tapered aperture 78, then the water discharged from the brush 12 (shown in FIG. 1) would not be appropriate for rinsing. Since the wand 10 is particularly adapted for use in conjunction with an adjacent area such as a sink, where dishes are washed, it is important to provide fresh water for rinsing and the removal of soap from the items being cleaned.

Still referring to FIG. 5, the above-referenced clearance between tapered plug body 82 and tapered aperture 78 is most clearly shown. This clearance is as stated above, adjustable and the design facilitates the clean out of residue left in tapered aperture 78. The sliding action between the tapered surfaces of tapered plug body 82 and tapered aperture 78 breaks down and removes such residue during operation.

Referring now to FIGS. 1 through 5 in combination, the hose connector 18 of FIG. 1 may comprise a threaded sink hose connector for use with conventional sink areas. The hollow body 20 may be made of plastic and is shown in this particular embodiment as cylindrical. Other shapes and materials are contemplated for the construction of wand 10 including contoured configurations which may be more aesthetically pleasing for the user.

Referring now to FIG. 6, there is shown another embodiment of the present invention illustrated as a washing wand 100. The wand 100 has a first end 104 with a flexible water line 108 secured thereto, and a second end 106 with a utensil 102 disposed thereon. Although the utensil 102 is illustrated as being a brush, the utensil 102 can be any other instrument such as a spatula, a scraper, a probe, or the like. In one embodiment, the utensil 102 is detachably attached to the wand 100 for removal and replacement with other utensils. The washing wand 100 includes a housing 110 which is illustrated as an elongate, contoured body having a hollow construction forming a chamber therein that may be filled with liquid soap as will be discussed in more detail below. The washing wand 100 comprises apparatus for the storage and discharge of concentrated liquid soap and/or water for the washing and/or rinsing of items in an adjacent area such as a sink 118. For convenience, the washing wand 100 may be mounted in a vertical orientation with respect to the area of use (such as the sink 118) by the use of an escutcheon 120 and an escutcheon nut 122 in conjunction with an aperture in the sink 118 or other item in the area of use.

Still referring to FIG. 6, water is provided to the wand 100 under pressure by the flexible water line 108. The water passes through flexible water line 108, through a flow path within the wand 100, and is discharged through the utensil 102 without soap in a first operational mode. As described in greater detail below, the flow path within the wand 100 is constructed with a venturi chamber that has an access port connected to an adjacent soap chamber by a soap valve having a soap actuation button 116. When the soap actuation button 116 is depressed, concentrated liquid soap contained within a chamber in the elongate, contoured body or housing 110 is drawn into the water that passes through the wand 100 and is discharged through the utensil 102 with the water in a second operational mode.

Referring now to FIG. 7, there is shown a perspective view, with parts broken away to illustrate interior details, showing the soap dispensing washing system of FIG. 6. In this particular view, the flow path through the wand 100 is illustrated as the flow member 124, which is disposed in and aligned through the elongate, contoured body or housing 110 of the wand 100. In the illustrated embodiment, the flow path member 124 includes an inlet flange 162, a first tubular section 148, a water valve 126, a second tubular section or venturi section 150 with the soap valve 130 thereon, a third tubular section 152, and an outlet flange 144. The water valve 126 includes a water valve actuation button 128, and the soap valve 130 includes soap actuation button 116.

Still referring to FIG. 7, posts 134 protrude outwardly from the flow path member 124 and protrude into post receptacles 136 which extend inwardly from the first half 112 (not shown in FIG. 7) and the second half 114 of the body or housing 110. The posts 134 and the post receptacles 136 assist in maintaining the first half 112 (shown in FIG. 6) and the second half 114 of the housing 110 in alignment, and maintaining the flow member 124 in alignment within the housing 110. The water actuation button 128 of the water valve 126, and the soap valve actuation button 116 of the soap valve 130 are disposed external to the housing 110.

Figure 8:
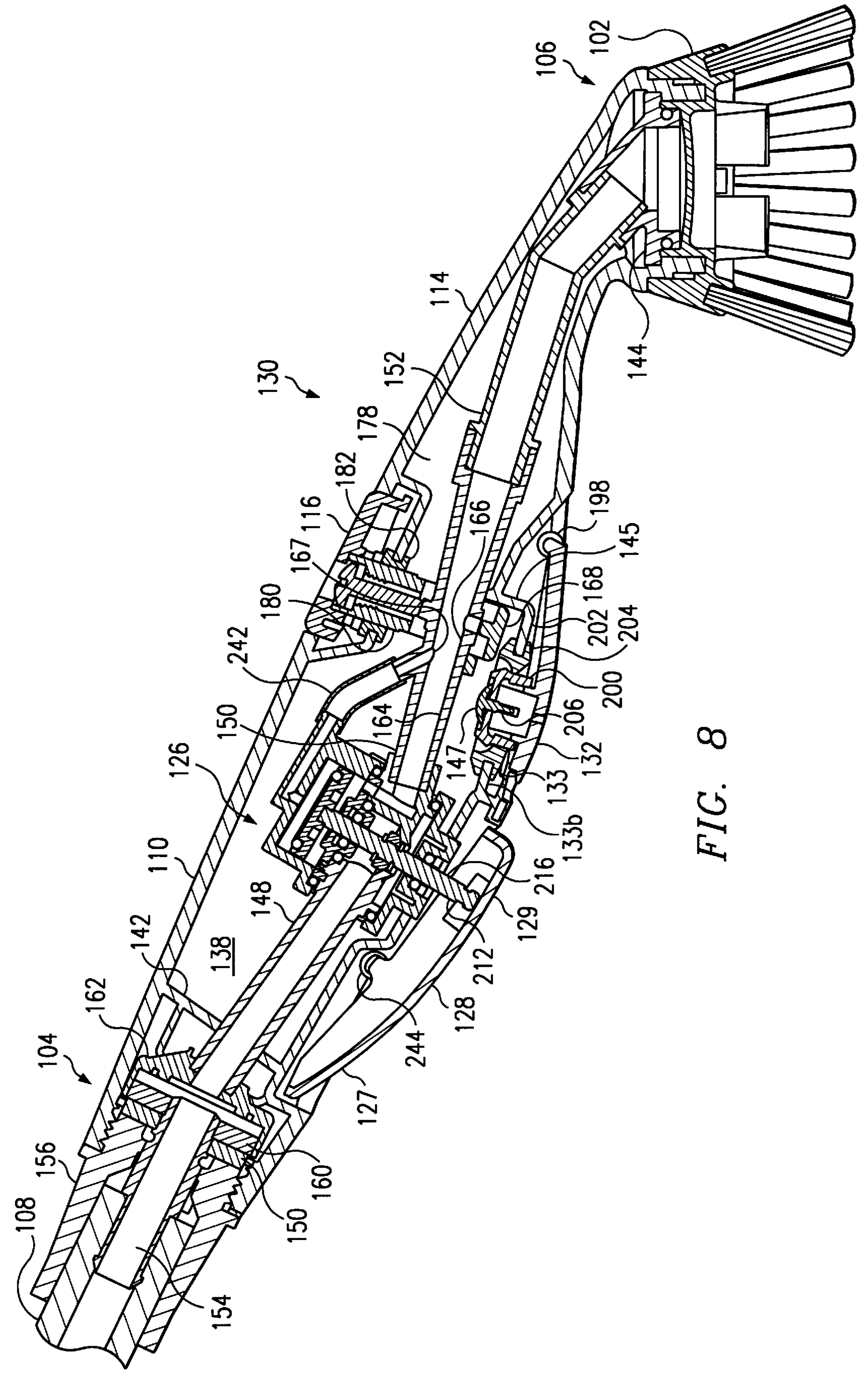
FIG. 8 is an enlarged side elevational, cross-sectional view of the washing system of FIG. 6.

Referring now to FIG. 8, there is shown an enlarged side elevational, cross-sectional view of the soap dispensing washing wand 100. The water line 108 supplies water under pressure to a inlet tube 154 in a rear nut 156 of the wand 100. The rear nut 156 threadably engages the first half 112 (shown in FIG. 6) and the second half 114 of the housing 110 at the first end 104 of the wand 100. The rear nut 156 forces sealing washers 158 and 160 into a sealing engagement with the inlet flange 162, to form a non-leaking seal from the inlet tube 154 to the inlet flange 162. First tubular section 148 extends between inlet flange 162 and the water valve 126, while second tubular section or venturi section 150 extends between water valve 126 and third tubular section 152, and the third tubular section 152 connects with the outlet flange 144.

Referring still to FIG. 8, venturi section 150 is constructed with a narrow venturi throat 164 having a cross-sectional diameter which, in the present embodiment, is substantially smaller than the cross sectional diameter of first tubular section 148. The narrow venturi throat 164 is followed by and is in axial flow communication with an outwardly tapering, venturi throat 166 forming a conventional venturi section which discharges into third tubular section 152 and then into and through outlet flange 144. Fluid from the outlet flange 144 exits the wand 100 through the utensil 102.

Referring now to FIGS. 6, 7, and 8 in combination, the first half 112 and the second half 114 of the housing 110 seal together, and seal with the first tubular section 148 and the outlet flange 144 of the flow path member 124, to form a soap chamber 138. The soap chamber 138 is defined by the area within the housing 110 between the wall 142 and the outlet flange 144, and that is external to the flow member 124. In the embodiment illustrated, the housing 110 also seals with the water valve 126, and a grommet 182 provides a seal between the housing 110 and the soap valve 130. A soap chamber access opening 133 is formed in the housing 110 by a first soap access opening **133*a* (not shown) in the first half 112 and a second soap access opening 133*b* in the second half 114. A grommet 202 is positioned within the opening 133 for sealing engagement with soap access door 132 when access to the soap chamber 138** is not necessary.

Referring still to FIGS. 6, 7 and 8, soap access door 132 is pivotally mounted with respect to first half 112 and second half 114 of elongate, contoured body or housing 110 at pivot means 198. Pivoting soap door 132 counterclockwise, as shown in FIG. 8, removes soap access door seal 200 from sealing engagement with grommet 202 so that liquid soap may be placed into soap chamber 138 through aperture 133. The sealing arrangement of soap access door seal 200, grommet 202, and housing 110 provide a sealing configuration to prevent soap from leaking out of soap chamber 138. The door seal 200 has an annular ring 204 disposed inwardly from the grommet 202 to help prevent inadvertent opening of the soap access door 132. In one embodiment, the door seal 200 and the grommet 202 are sized to allow the soap access door 132 to open when the pressure in the soap chamber 138 reaches a critical pressure, thereby providing a safety valve relief for the soap chamber 138 of the wand 100. Check valve 206 is operatively positioned in soap access door seal 200 to allow vent air to pass into soap chamber 138.

Figure 9:
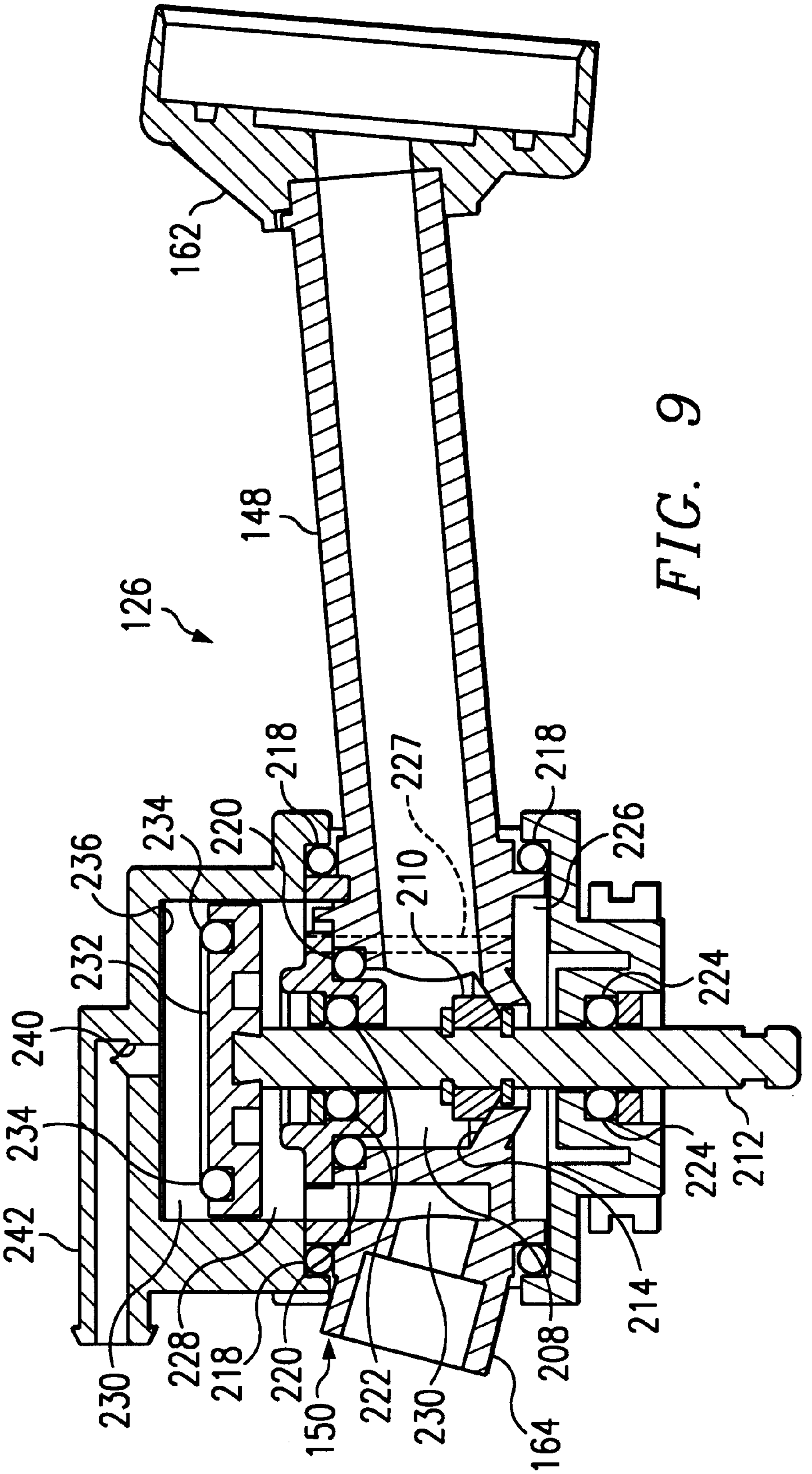
FIG. 9 is an enlarged cross-sectional view of the water valve assembly of FIG. 8 illustrating the "closed position" of the water valve assembly.
Figure 10:
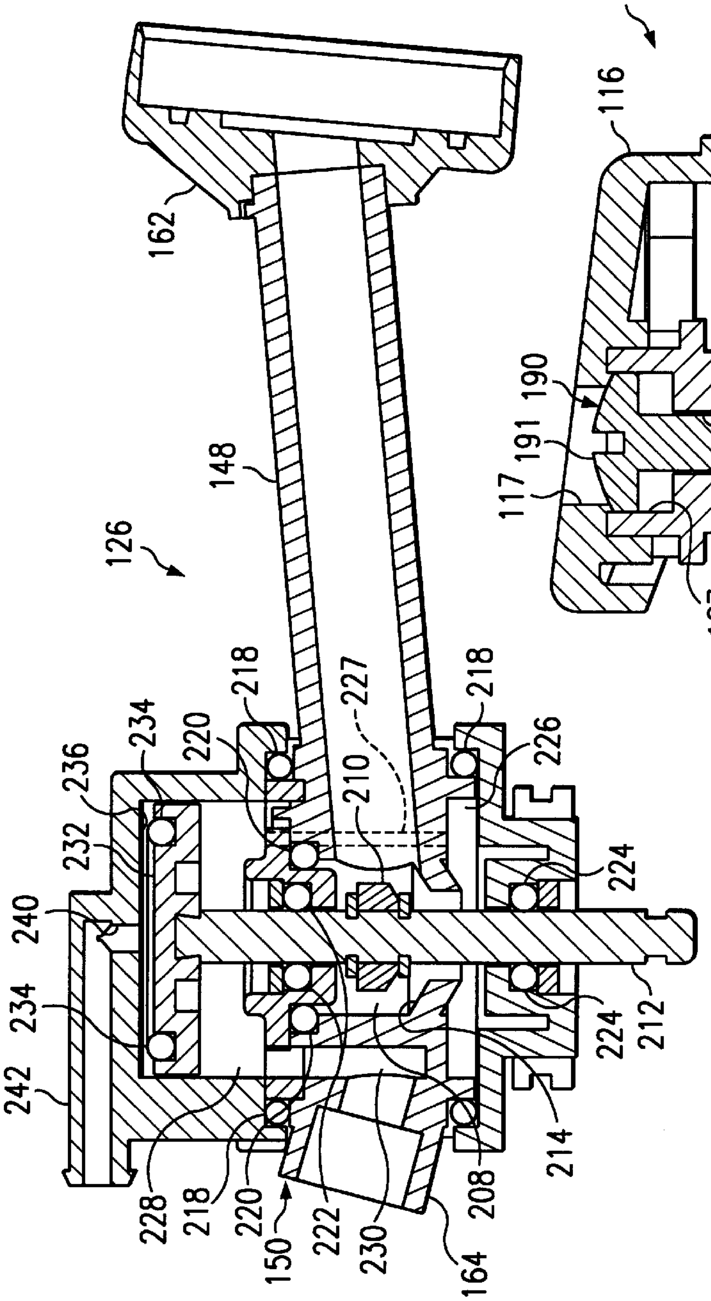
FIG. 10 is an enlarged cross-sectional view of the water valve assembly of FIG. 8 illustrating the "open position" of the water valve assembly.

Referring now to FIGS. 9 and 10, there is shown an enlarged, side elevational, cross-sectional view of the water valve 126 in the closed position and in the open position, respectively. Water from the flexible water line 108 (shown in FIG. 8) flows through the inlet flange 162, the first tubular section 148 and into an inlet chamber 208 of the water valve 126. A rubber gasket or seal 210 is mounted to a shaft or pin 212 and is sealingly forced against a seat 214 by a spring 216 (shown in FIG. 8). O-rings 218 and 220 together with rubber gasket or seal 210 prevent the water from leaving the inlet chamber 208 when the water valve 126 is in the closed position. Any water leakage around shaft or pin 212 is prevented by O-rings 222 and 224.

Referring now to FIGS. 8, 9, and 10, the water valve actuator button 128 has a rearward portion 127 and a forward portion 129 separated by a pivot point 244. The pin 212 is connected to the forward portion 129 of the water valve actuator button 128, and the pivot point 244 rests against the housing 110. The spring 216 is positioned for applying force to the water valve actuator button 128 in a manner that biases the water valve 126 towards the closed position.

Referring still to FIGS. 8, 9, and 10, when it is desired to have water flow through the wand 100, pressure is applied to the forward portion 129 of the water valve actuation button 128 to force shaft or pin 212 upwardly and move rubber gasket or seal 210 from seat 214. The diameter of the rubber gasket or seal 210 is made small to reduce the amount of force required to raise the rubber gasket or seal 210 against the water pressure in chamber 208. Once the rubber gasket or seal 210 is raised from seat 214 (or water valve 126 is cracked open), water flows past the seat 214 into an intermediate chamber 226. The intermediate chamber 226 is connected to a control chamber 228 by two flow passages 227, only one of which is shown in phantom lines (the other flow passage 227 is on the side of the water valve 126 that is removed by the cross-sectional view). Water flowing into the control chamber 228 exits the water valve 126 into the venturi 150 through an exit passage 230, and continues through the wand 100.

Still referring to FIGS. 8, 9, and 10, pressure from the water flowing into the control chamber 228 applies an upward force against a disk 232 that is secured to the shaft 212 of the water valve 126. Water which is located above the disk 232 as the disk 232 moves, or that flows past the edge of disk 232 is vented out a port 240 and an exit line 242, which exits into a bleed port 167 in the venturi section 150. Venturi section 150 provides a lower pressure in exit line 242 which also assists in pulling and holding the disk 232 in the upward position. When the disk 232 reaches a top surface 236 of the control chamber 228, an o-ring 234 on the disk 232 seals around the port 240 that is located in the top surface 236. The force against the disk 232 due to the pressure of the water flowing through the chamber 228, and due to the pull on the disk 232 from the lower pressure in the venturi section 150 transmitted by the port 240, the exit line 242, and the bleed port 167, overcomes the force of the spring 216 and holds the valve 126 in an open position. In the open position, water will continue to flow through the water valve 126 without applying any further pressure on the water valve actuation button 128. This feature is a fluid pressure assist feature which forces the water valve 126 into the open position without further pressure on the water valve actuation button 128 and maintains it in the open position once the water valve 126 is cracked open.

Still referring to FIGS. 8, 9, and 10, pressure applied to the rearward portion 127 of the water valve actuation button 128 will pivot the water valve actuation button 128 raising the pin 212 to force the seat rubber gasket or seal 210 against the seat 214 and stop the flow of the water through the water control valve 126 and the flow path member 124. Also, if the water supply to the washing wand 100 is discontinued, the forces on the disk 232 are discontinued and the spring 216 automatically moves the valve 126 to an off position. The spring 216 automatically biases the water valve 126 to a closed position, which is overcome when force on the forward portion of the water valve activation button 116 moves the pin 212 of the water valve 126 to a position where the water flowing through the water valve 126 and the flow path 124 creates sufficient force on the disk 232 to overcome the forces of the spring 216. Even without the lower pressure from the venturi section 150 on the disk 232, water valve 126 is very bi-stable. In other words, with a small amount of force, water valve 126 will go from closed position to the open position and will go from the open position to the closed position and will stay in the closed position. However, the lower pressure from the venturi section 150 on the disk 232 will allow the water valve 126 to work over a much broader pressure range.

Figure 11:
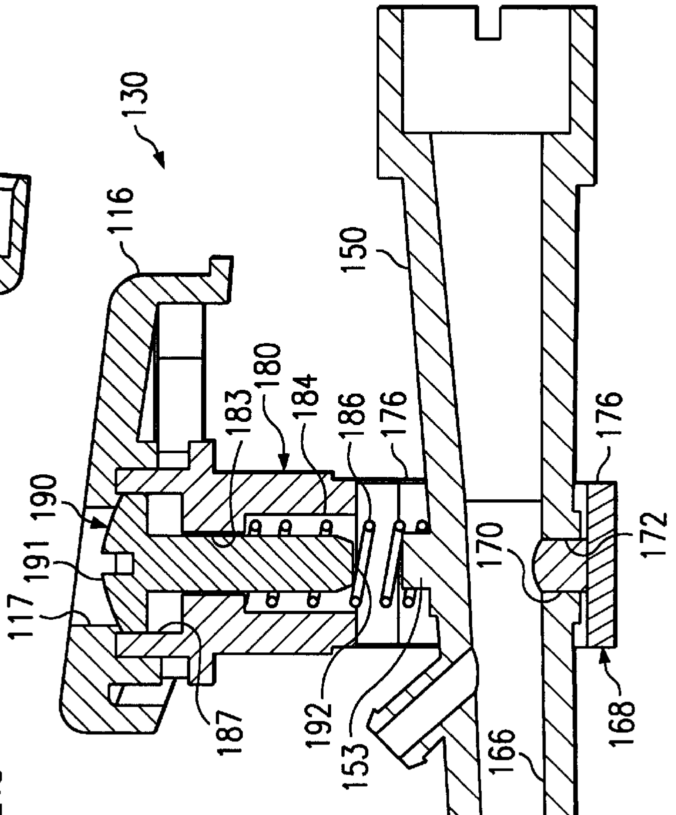
FIG. 11 is an enlarged, side elevational, cross-sectional view of a portion of the soap metering system of the washing system of FIG. 8.

Referring now to FIG. 11, there is shown a cross-sectional view of the venturi section 150 and the soap valve 130. The soap valve generally comprises a metering plug 168, secured to an actuation member 180, and the soap actuation button 116 secured to the actuation member 180. The venturi section 150 includes a tapered aperture or port 170 formed in the sidewall of the outwardly tapering, venturi throat 166. The metering plug 168 includes a tapered plug body 172 having sidewalls adapted for matingly engaging the taper of the tapered aperture or port 170 in the venturi section 150. The tapered plug body 172 is attached to side members 176 of the metering plug 168 that extend outwardly and along each side of the venturi section 150 and are secured to the actuation member 180. A spring member 186 is installed in a lower spring cavity 184 with the lower end positioned over a post 154 extending from the venturi section 150. The spring member 186 applies a bias to the actuation member 180 which lifts the actuation member 180 and the metering plug 168 to engage the tapered plug body 172 into engagement with the tapered aperture 170 of the venturi section 150. A grommet 182 attached to the housing 110 provides a seal between the housing 110 and the actuation member 180 of the soap valve 130.

Referring still to FIG. 11, an adjustment screw 190 threadably engages a threaded aperture 183 in the actuation member 180, which is located directly above the post 154 on the venturi section 150. The head 191 of the adjustment screw 190 is disposed within an adjustment aperture 187 in the actuation member 180. The soap actuation button 116 is secured to the actuation member 180, and has an adjustment screw access aperture 117 disposed above the adjustment screw head 191. The head 191 of the adjustment screw 190 is larger than the adjustment aperture 117 in the soap actuation button 116, so that the adjustment screw 190 cannot be accidentally removed from the actuation member 180.

Still referring to FIG. 11, when the soap actuation button 116 is depressed, the actuation member 180 and the metering plug 168 move downwardly until an adjustment screw end 192 of the adjustment screw 190 engages the post 153 on the venturi section 150. As the metering plug 168 moves downwardly relatively to the venturi section 150, a gap is created between the tapered plug body 172 and the tapered aperture or port 170. A guidance wall 145 and a guidance bar 147 on the housing 110 hold the metering plug 168 in alignment with the tapered aperture or port 170 in the venturi section as the metering plug 168 moves up and down.

Referring still to FIG. 11, it can be seen that the distance between the end 192 of the adjustment screw 190 and the post 153 on the venturi section 150, in a non-depressed condition, determines the maximum travel of the soap actuation button 116, the actuation member 180, and the metering valve 168, and therefore the maximum distance between the port 170 and the plug body 172. By moving the adjustment screw 190 inward relative to the actuation member 180, the maximum travel of the soap actuation on button 116, the actuation member 180 and metering plug 168 is decreased, thereby decreasing the maximum gap between the plug body 172 and the tapered aperture or port 170 of the venturi section 150. By moving the adjustment screw 190 in the outward direction relative to the actuation member 180, the maximum travel of the soap actuation button 116, actuation member 180, and metering plug 168 is increased, thereby increasing the maximum gap between the tapered plug body 172 of the metering plug 168 and the tapered aperture 170 of the venturi section 150. The greater the maximum gap between the plug body 172 of the metering plug 168 and the tapered aperture 170 of the venturi section 150, the greater the maximum flow of soap in the soap chamber 138 will be into the flow of water through the venturi section 150. In a preferred embodiment, the travel of the adjustment screw 190 is limited so that the maximum gap between the plug body 172 and the tapered aperture 170 is adjustable between 1/32" and 3/32".

Referring now to FIGS. 6, 7, 8, and 11, in operation, when it is desired to have soap from soap chamber 138 to be drawn into and mixed with the water passing through venturi section 150, soap actuation button 116 is depressed moving downwardly against the pressure of spring member 186 and the tapered plug body 172 from a seated position in tapered aperture or port 170 to an unseated position which provides a gap between tapered plug body 172 and the tapered aperture or port 170. Soap is then drawn from the soap chamber 138 through the gap between the tapered plug body 172 and the port 170 and into the venturi section 150 by the flow of water passing through venturi section 150. When soap is no longer desired in the washing task, the soap actuation button 116 is released and the spring member 186 raises the actuating member 180 and the metering plug 168 upwardly into a rest position where the tapered plug body 172 seats within tapered aperture or port 170 stopping the flow of soap from the soap chamber 138 into the venturi section 150. The upward movement of the tapered plug body 172 into the tapered aperture or port 170, and the seating of the tapered plug body 172 with the tapered aperture or port 170, cleans out accumulations of soap and other matter that collect in the tapered aperture or port 170, thereby providing a self-cleaning function for the port 170.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A wand for containing and discharging liquid soap and water under pressure in a first operational mode and only water in a second operational mode, for the washing of items in an adjacent area, said wand comprising:

a housing having a brush disposed on an end thereof;

said housing having a hollow portion formed therethrough for defining a flow path therein, said flow path including a first end comprising a connector for attachment to a pressurized water supply and a second end attached to said brush;

means for sealing said housing for defining a liquid chamber therein for the containment of liquid soap;

a venturi throat formed within said flow path of said housing having a first port in flow communication with said pressurized water supply and a second port in flow communication with said liquid chamber;

removable metering means positioned in said second port for metering a select amount of liquid soap from said liquid chamber into said venturi throat during the passage of pressurized water therethrough in said first operational mode;

means for adjusting the distance said removable metering means may be removed from said second port for changing the select amount of liquid soap metered from said liquid chamber; and a water valve to control the flow of water through the flow path.

2. The apparatus as set forth in claim 1 wherein said venturi throat comprises a first, narrow throat contiguous to a second, outwardly tapering throat of enlarging diameter.

3. The apparatus as set forth in claim 1 wherein said brush is removable.

4. The apparatus as set forth in claim 1 wherein said liquid soap is of the concentrated variety of varying viscosities.

5. The apparatus as set forth in claim 1 wherein said housing is generally contoured and said flow path of said housing comprises a tubular member having said venturi throat formed therein, said tubular member being generally axially aligned within said generally contoured housing.

6. The apparatus as set forth in claim 5 wherein said removable metering means comprises a plug removably mounted within said second port.

7. The apparatus as set forth in claim 6 wherein said second port comprises a tapered aperture formed through said flow path of said housing.

8. The apparatus set forth in claim 7 wherein said plug is formed with tapered side walls received within said tapered aperture.

9. The apparatus as set forth in claim 8 and further including a button formed on said housing connected to said plug for the movement thereof outwardly of said tapered aperture upon the depression of said button.

10. The apparatus as set forth in claim 8 wherein said tapered aperture and said plug are each formed with a common taper angle for facilitating the clean out of any liquid soap residue left in said tapered aperture after metering therethrough.

11. The apparatus as set forth in claim 1 wherein said housing is constructed with check valves for controlling both positive and negative pressures therein.

12. The apparatus as set forth in claim 6 wherein the length of said plug is greater than the wall thickness of said tubular member.

13. The apparatus as set forth in claim 9 further including a threaded screw to adjust the distance said removable metering means may be removed, said threaded screw is captured by said button so said threaded screw cannot be removed from said button during the adjusting of the distance said removable metering means may be removed.

14. The apparatus as set forth in claim 1 wherein said water valve comprises fluid assist elements to move said water valve to the fully open position by using the pressurized water in said wand upon movement of the water valve from the closed position, said water valve remaining in the fully open position by the force of the pressurized water.

15. The apparatus as set forth in claim 14 wherein said water valve also uses a negative pressure from the venturi throat to assist in maintaining the water valve in the fully open position.

16. A wand for containing and discharging liquid soap and water under pressure in a first operational mode and only water in a second operational mode, for the washing of items in an adjacent area, said wand comprising:

a housing having a brush disposed on an end thereof;

said housing having a hollow portion formed therethrough for defining a flow path therein, said flow path including a first end comprising a connector for attachment to a pressurized water supply and a second end attached to said brush;

means for sealing said housing for defining a liquid chamber therein for the containment of liquid soap;

a venturi throat formed within said flow path of said housing having a first port in flow communication with said pressurized water supply and a second port in flow communication with said liquid chamber;

said second port comprises a tapered aperture formed through said flow path of said housing;

a plug having tapered sidewalls removably positioned in said second port for metering a select amount of liquid soap from said liquid chamber into said venturi throat during the passage of pressurized water therethrough in said first operational mode;

means for adjusting the distance said plug may be moved from a seated position in said second port for providing an annular orifice of a size which increases with further removal of the plug from the seated position and thereby changing the select amount of liquid soap metered from said liquid chamber; and a fluid assist water valve to control the flow of water through the flow path.

17. A method of manufacturing a soap and water dispensing apparatus for selectively containing and discharging liquid soap and/or water under pressure for the washing and rinsing of items adjacent a sink, said method comprising the steps of:

forming a housing with a brush disposed on an end thereof;

forming said housing with a hollow portion therethrough for defining a flow path therein, said flow path including a first end comprising a connector for attachment to a pressurized water supply and a second end attached to said brush;

providing means for sealing said housing and defining a liquid chamber therein for the containment of liquid soap;

forming a venturi throat within said flow path of said housing having a first port in flow communication with said pressurized water supply and a second port in flow communication with said liquid chamber;

forming said venturi throat with a first narrow throat of a first, generally uniform diameter contiguous to a second, outwardly tapering throat of enlarging diameter;

providing a metering plug;

removably positioning said metering plug in said second port for metering a select amount of liquid soap from said liquid chamber into said venturi throat during the passage of pressurized water therethrough;

providing means for adjusting the distance said metering plug may be removed from said second port for changing the select amount of liquid soap metered into said venturi throat; and providing a fluid assist water valve to control the flow of water through the flow path.

18. A wand for containing and discharging liquid soap and water under pressure in a first operational mode and only water in a second operational mode, for the washing of items in an adjacent area, said wand comprising:

a housing having internal means defining a flow path therethrough including a first inlet end for connection to a pressurized water supply and a second discharge end;

said housing having internal means defining a liquid chamber separate from said flow path for containment of liquid soap;

means defining a venturi throat in said housing along said flow path through said housing;

means defining an opening between said venturi throat and said liquid chamber;

valve means in said opening to said venturi throat for admitting liquid soap from said liquid chamber into said flow path through said housing during passage of pressurized water therethrough in said first operational mode and for closing said opening to said venturi throat in said second operational mode; and a bi-stable water valve to control the flow of water through the flow path, said water valve being spring biased closed and being adapted to be mechanically opened and thereafter remain open responsive to water flow through said valve until said water flow ceases or said valve is mechanically closed.

19. The apparatus as set forth in claim 18 wherein said water valve comprises fluid assist elements to move said water valve to a fully open position by using the pressurized water in said flow path through said housing upon movement of the water valve from the closed position, said water valve remaining in the fully open position by the force of the pressurized water.

20. The apparatus as set forth in claim 19 wherein said valve in said opening to said venturi throat is adjustable for changing the select amount of liquid soap flowing from said liquid chamber into said flow path through said housing.

21. Apparatus as set forth in claim 18 including means at said first end of said housing for attachment to a pressurized water supply and means at said second end of said housing for connection of said wand to an instrument selected from the class consisting of a brush, a spatula, a scraper, and a probe.

22. Apparatus as set forth in claim 21 wherein said water valve comprises fluid assist elements to move said water valve to a fully open position using the pressurized water in said flow path through said housing upon movement of the water valve from the closed position, said water valve remaining in the fully open position by the force of the pressurized water.

23. Apparatus as set forth in claim 22 wherein said valve in said opening to said venturi throat is adjustable for changing the selected amount of liquid soap flowing from said liquid chamber into said flow path through said housing.

24. Apparatus as set forth in claim 19 wherein said fluid assist elements of said water valve comprise:

means defining a control chamber communicating with an inlet of said water valve and with an outlet of said water valve; and a control disk in said control chamber connected with said water valve, a first side of said control disk being exposed to a first fluid pressure in said water valve in said control chamber downstream from said water valve and a second side of said control disk being exposed to a second further reduced pressure communicated to said control chamber from downstream of said water valve whereby said water valve remains open after an initial force holding said valve closed is exceeded.

25. Apparatus as set forth in claim 24 in said water valve comprises:

a valve seat around said flow path through said water valve;

a valve shaft;

a valve seal on said shaft adapted to engage said valve seat to control flow through said valve;

means connected with said shaft biasing said shaft and said valve seal toward said valve seat;

said control disk being mounted on said shaft in said control chamber; and means defining a flow passage for communicating said second reduced pressure to said control chamber on said second side of said control disk from downstream of said water valve.

26. A fluid control valve adapted to control flow of fluid through said valve and to remain open so long as fluid flows through said valve after application of an initial force moving said valve from a closed position to an open position, said valve comprising:

means defining a control chamber communicating with an inlet of said valve and with outlet of said valve; and a control disk in said control chamber connected with said valve, a first side of said control disk being exposed to a first fluid pressure flowing through said valve in said control chamber when said valve is open and downstream from said valve and a second side of said control disk being exposed to a second further reduced pressure communicated to said control chamber from downstream of said valve whereby said valve remains open after said initial force holding said valve closed is exceeded.

27. A fluid control valve in accordance with claim 26 wherein said valve comprises:

a valve seat around a flow passage through said valve;

a valve shaft;

a valve seal on said shaft for movement relative to said seat to control flow through said valve;

means connected with said shaft biasing said shaft and said valve seal toward said valve seat;

said control disk is mounted on said shaft in said control chamber; and means for communicating said second reduced pressure into said control chamber from downstream for said valve.

28. A fluid control valve in accordance with claim 27 including:

a spring connected with said shaft biasing said shaft and said valve seal to a closed position; and an actuator button coupled with said shaft for moving said shaft and said seal from a closed to an open position.

29. A fluid control valve in accordance with claim 28 wherein said actuator button is coupled with said valve shaft whereby a force on one end of said button opens said valve and a force on the opposite end of said button closes said valve.

30. A fluid control valve in accordance with claim 29 wherein the strength of said spring and the relationship between the diameters of said valve seal and said control disk provides a bi-stable valve stable in said open position and stable in said closed position operable over a broad pressure range between said open and closed positions.

31. A fluid control valve in accordance with claim 30 wherein said control disk is larger in diameter than said valve seal.

32. A bi-stable fluid control valve operable over a broad pressure range and stable in both the closed and open positions comprising:

a valve housing;

a flow path through said housing;

a valve seat around said flow path;

a valve seal engageable with said valve seat to open and close said valve;

a valve shaft supporting said valve seal;

spring means connected with said valve shaft biasing said valve toward a closed state;

an actuation button coupled with said valve shaft to open and close said valve;

a control chamber in said housing communicating with an inlet to said valve and an outlet from said valve;

a control disk in said control chamber on said valve shaft, one side of said control disk being exposed to a first fluid pressure in said valve when said valve is open and a second side of said control disk being exposed to a second reduced pressure communicated to said control chamber from downstream of said valve; and the strength of said spring means and the diameter of said valve seal and said control disk being related to cause said valve to remain stable in both open and closed conditions and to operate over a broad pressure range without force on the actuation button after initial opening of said valve.

* * * * *

UNITED STATES PATENT AND TRADEMARK OFFICE

CERTIFICATE OF CORRECTION

PATENT NO. : 5,988,911

DATED : November 23, 1999

INVENTOR(S) : Browne, Jr., et al.

It is certified that error appears in the above-identified patent and that said Letters Patent is hereby corrected as shown below:

| | |
|---|---|
| **Column 3, line 11** | Replace "4–4"<br>With --4-4-- |
| **Column 4, line 13** | Replace "2–2"<br>With --2-2-- |

Signed and Sealed this

Sixteenth Day of January, 2001

*Attest:*

Q. TODD DICKINSON

*Attesting Officer*

*Commissioner of Patents and Trademarks*